United States Patent
Marggraff et al.

(10) Patent No.: US 6,750,978 B1
(45) Date of Patent: Jun. 15, 2004

(54) PRINT MEDIA INFORMATION SYSTEM WITH A PORTABLE PRINT MEDIA RECEIVING UNIT ASSEMBLY

(75) Inventors: James Marggraff, Lafayette, CA (US); Michael C. Wood, Orinda, CA (US)

(73) Assignee: Leapfrog Enterprises, Inc., Emeryville, CA (US)

(*) Notice: Subject to any disclaimer, the term of this patent is extended or adjusted under 35 U.S.C. 154(b) by 0 days.

(21) Appl. No.: 09/632,534

(22) Filed: Aug. 4, 2000

Related U.S. Application Data

(60) Provisional application No. 60/200,715, filed on Apr. 27, 2000.

(51) Int. Cl.$^7$ ................................................ G06F 7/10
(52) U.S. Cl. ........................ 358/1.12; 235/462.15; 235/375; 358/1.15; 369/24.01; 369/27.01; 434/365; 434/317; 434/169
(58) Field of Search ............... 358/1.1, 1.2, 1.3, 358/1.4, 1.5, 1.6, 1.7, 1.8, 1.9, 1.11–1.18; 345/335, 173, 156, 162, 169, 179; 235/462.15, 375; 434/317, 365, 318, 169, 319, 308, 309, 307 R; 369/24.01, 27.01, 29.02; 725/133; 463/30, 31, 36, 37

(56) References Cited

U.S. PATENT DOCUMENTS

| | | | |
|---|---|---|---|
| 5,105,338 A | * | 4/1992 | Held ............................ 361/391 |
| 5,365,434 A | * | 11/1994 | Figliuzzi ................. 364/419.13 |
| 5,485,176 A | * | 1/1996 | Ohara et al. .................. 345/173 |
| 5,597,307 A | | 1/1997 | Redford et al. ............... 434/118 |
| 5,624,265 A | * | 4/1997 | Redford et al. ............... 434/307 |
| 5,679,075 A | * | 10/1997 | Forrest et al. ................... 463/9 |
| 5,686,705 A | | 11/1997 | Conroy et al. ................. 178/19 |
| 5,749,735 A | | 5/1998 | Redford et al. ......... 434/307 R |
| 5,788,507 A | | 8/1998 | Redford et al. ......... 434/307 R |
| 5,795,156 A | | 8/1998 | Redford et al. ............... 434/118 |
| 5,839,905 A | | 11/1998 | Redford et al. ......... 434/307 R |
| 5,850,214 A | | 12/1998 | McNally et al. ............. 345/173 |
| 5,869,819 A | | 2/1999 | Knowles et al. .............. 235/375 |
| 5,878,230 A | * | 3/1999 | Weber et al. ............ 395/200.68 |
| 5,886,898 A | | 3/1999 | Choudhury et al. ...... 364/478.02 |
| 5,902,353 A | | 5/1999 | Reber et al. .................. 709/219 |
| 5,905,248 A | | 5/1999 | Russell et al. ............... 235/462 |
| 5,905,251 A | | 5/1999 | Knowles .................. 235/472.01 |
| 5,911,582 A | | 6/1999 | Redford et al. ......... 434/307 R |
| 5,925,127 A | * | 7/1999 | Ahmad ......................... 713/200 |
| 5,929,849 A | | 7/1999 | Kikinis ......................... 345/327 |
| 5,932,863 A | * | 8/1999 | Rathus et al. ............ 235/462.15 |
| 5,933,829 A | | 8/1999 | Durst et al. .................... 707/10 |
| 5,938,727 A | | 8/1999 | Ikeda ........................... 709/218 |
| 5,978,773 A | | 11/1999 | Hudetz et al. ................ 705/23 |
| 5,992,752 A | | 11/1999 | Wilz, Sr. et al. ......... 235/472.01 |
| 6,012,102 A | | 1/2000 | Shachar ........................... 710/5 |
| 6,027,024 A | | 2/2000 | Knowles .................. 235/472.01 |
| 6,045,048 A | | 4/2000 | Wilz, Sr. et al. ......... 235/472.01 |
| 6,049,835 A | | 4/2000 | Gagnon ........................ 709/245 |
| 6,052,717 A | | 4/2000 | Reynolds et al. ............ 709/218 |
| 6,068,188 A | | 5/2000 | Knowles .................. 235/462.01 |
| 6,327,459 B2 | * | 12/2001 | Redford et al. .............. 434/365 |

OTHER PUBLICATIONS

Abstract of JP11259400A2, Aoki Wataru, et al., Sep. 24, 1999, entitled "Method and System for Connecting Internet and Strorage Medium Storing Internet Connection Program," http://www.delphion.com, 2 pages (Nov. 20, 2000).
Abstract of WO9741690A1, Dan Kikinis, Nov. 6, 1997, entitled "TV with URL Reception for Internet Access," http://www.delphion.com., 2 pages (Nov. 20, 2000).

* cited by examiner

*Primary Examiner*—King Y. Poon
(74) *Attorney, Agent, or Firm*—Townsend and Townsend and Crew LLP

(57) ABSTRACT

The present invention relates to a novel interactive information system which can be used to make a traditional print medium such as a magazine, "interactive". When the traditional print medium is placed on a print media receiving unit in a predetermined position, a user can interact with the traditional print medium. Printed matter elements on the printed medium can be made "selectable" by the user.

38 Claims, 9 Drawing Sheets

PRINT MEDIA INFORMATION SYSTEM WITH A PORTABLE PRINT MEDIA RECEIVING UNIT ASSEMBLY

CROSS REFERENCE TO RELATED APPLICATIONS

This application claims the benefit of the U.S. Provisional Patent Application No. 60/200,715 filed Apr. 27, 2000, which is herein incorporated by reference in its entirety for all purposes.

FIELD OF THE INVENTION

Embodiments of the invention relate to systems and methods for interacting with or augmenting print media.

BACKGROUND OF THE INVENTION

"Hard copy" print media such as paperback books have a number of advantages over electronic publications. Some electronic books, for example, can be read using a device such as a personal digital assistant (PDA). However, the screens of PDAs are very small and it can be difficult to read the text of books on the PDAs. Moreover, it is difficult to manipulate the pages of an electronic book as a user must scroll through a number of pages to get to a page of interest. It is often faster for the user to turn a page of an ordinary book to quickly get to the desired page. Because the pages of an ordinary book can be turned quickly, the user can understand the context of a story or article that occupies many pages of the book much more quickly than would otherwise be the case when turning the pages of an electronic book. Furthermore, although improvements have been made to electronic display screens in recent years, printed matter on paper is often easier for people to read than electronic print on an electronic display screen. For instance, glare on an electronic display screen can make an electronic book difficult to read. Paper, on the other hand, typically does not produce excessive glare. Lastly, although sales of electronic publications are increasing, sales of traditional print media remain very high indicating a continuing consumer preference for hard copy print media. One reason for this may be that traditional print media are typically easier to use than electronic print media.

Although hard copy printed media have many advantages over electronic publications, hard copy printed media have a number of limitations. For example, the information which can be present in a hard copy printed medium such as a magazine is limited to the number of pages within it. If the reader wants additional information about a particular subject being read, the reader must take the time search for the information. For example, if a reader wants more information about a product in a story or an advertisement that he or she sees in a magazine, the reader must take affirmative steps to locate the additional information. The reader can contact the seller of the product by mail, phone or the Internet to obtain additional information about the particular product advertised. The additional effort undertaken by the reader is very inconvenient to the reader. Moreover, the retrieval of the additional information is delayed by the time needed to determine how to obtain the information as well as the time needed to actually obtain the information.

To address this problem, some have suggested printing specialized machine readable codes such as barcodes or digital watermarks containing embedded information of a uniform resource locator (URL) on the pages of a print medium such as a magazine. The barcodes or watermarks can then be scanned using a scanner and a computer can obtain auxiliary information from the Internet using the URL.

Printing many specialized machine readable codes such as multiple barcodes or digital watermarks on a print medium such as a magazine, however, has a number of disadvantages. For example, having many barcodes or watermarks in a print medium makes the printing process for the particular print medium more difficult and more expensive. The increased cost will likely deter many publishers from printing many the machine readable codes in their publications. Moreover, the visual appearance of a print medium is significantly compromised when the print medium includes multiple barcodes. Pages of a magazine, for instance, appear cluttered to a reader and thus less visually pleasing when many barcodes are present. Furthermore, if the barcodes or watermarks are blurred in some manner in the printing process, the scanner may not be able to scan the barcode and obtain the auxiliary information.

Embodiments of the invention address these and other problems.

SUMMARY OF THE INVENTION

Embodiments of the invention can provide auxiliary information to a user, conveniently and efficiently. The auxiliary information is provided to the user without significant effort on the part of the user. Moreover, in embodiments of the invention, a "hard copy" print medium is used. The benefits of a traditional hard copy print medium are retained while gaining the ability to efficiently retrieve auxiliary information related to the print medium and perform actions related to the print medium.

One embodiment of the invention is directed to a print media information system. The system comprises: (a) a print media receiving unit including (i) a surface suitable for receiving a print medium, and (ii) an electronic position determining system capable of determining a position of a selected portion of the print medium when the print medium is disposed on the surface; and (b) an information server computer adapted to perform a task after receiving the information relating to the position of the selected portion of the print medium.

Another embodiment of the invention is directed to a method of interacting with a print medium. The method comprises: (a) receiving information relating to a position of a selected portion of a print medium on a surface of a print media receiving unit comprising an electronic position determining system; and (b) performing a task after receiving the information relating to the position of the selected portion of the print medium.

Another embodiment of the invention is directed to a print media receiving unit. The unit comprises: a surface capable of receiving a print medium; an electronic detection system capable of detecting a section of a portion of the print medium by a user when the print medium is disposed on the surface; a writeable memory device adapted to receive auxiliary information from an information server computer; and an output device adapted to communicate the auxiliary information to a person.

Another embodiment of the invention is directed to a print media information system. The system comprises a print media receiving unit including (i) a surface suitable for receiving a print medium, and (ii) an electronic detection system capable of detecting a selection of a portion of the print medium by a user when the print medium is disposed on the surface; (b) an information server computer; and (c)

a print media database on or accessible to the information server computer.

Another embodiment of the invention is directed to a method of augmenting a print medium. The method comprises: (a) electronically encoding information relating to portions of a print medium; and (b) sending the information relating to the portions of the print medium to a user via a communication medium, wherein the sent information is to be used in a print media receiving unit comprising an electronic detection system capable of detecting a selected portion of the print medium when the print medium is disposed on the surface.

These and other embodiments are discussed in further detail below.

DEFINITIONS

Figure 1:
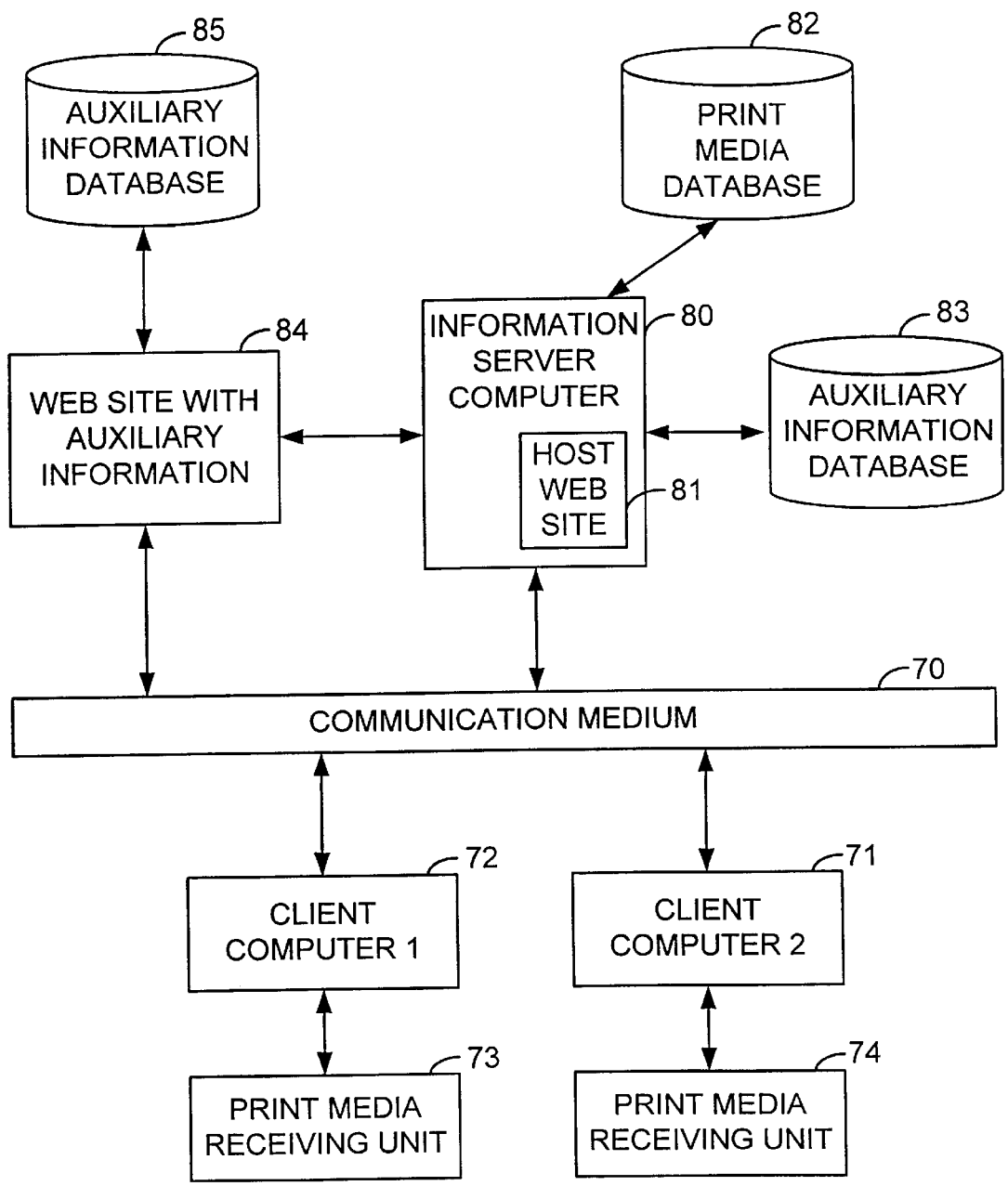
FIG. 1 shows a block diagram of a system according to an embodiment of the invention.

As used herein:

"auxiliary information" includes any type of information which can be used to supplement a selected portion of a print medium. Auxiliary information may be static or dynamic, and can be embodied in an auxiliary application or a content package of information.

An "auxiliary application" includes a computer application which relates to a portion of a print medium or is provided in response to a selection of a portion of a print medium. Auxiliary applications may run on a print media receiving unit, a client computer, or any other component.

A "communication medium" includes any suitable communication network. Examples of communication media may include the Internet, subsets of the Internet such as the World Wide Web, intranets, PCS (personal communication systems), cellular telephone networks, PSTNs (public-switched telephone networks) and non-proprietary and proprietary computer networks.

A "stylus" includes a device which is capable of selecting a letter, symbol, graphical patterns, elements of graphical patterns, or other print element.

An "information source" includes sources of information such as sources of auxiliary information, auxiliary applications, and content packages.

A "content package" includes a package of information sent to a user. In some embodiments, information and applications in a content package can be tailored to a user profile or a particular print medium.

A "user package" includes a package of information sent by a user.

A "print element" can include, alone or in combination, a photo, word, phrase, graphic pattern, symbol, paragraph, etc. in or on a print medium.

DETAILED DESCRIPTION

Embodiments of the invention can be used to make a traditional print medium such as a magazine, "interactive". When the traditional print medium is placed on a print media receiving unit in a predetermined position, a user can interact with the print medium by selecting print elements on the print medium. For example, a user can use a stylus to select (for example, by touching) a symbol for a stock on the print medium while it is disposed on the print media receiving unit. Auxiliary information such as the latest price for the stock can be presented to the user in audio or visual form in response to the selection. The auxiliary information may come from a server computer and may be provided to the print media receiving unit before or after the user makes a selection. Advantageously, portions of the print medium can "selected", even though the print medium is free of electronic circuitry.

The auxiliary information may be created by the publisher of the print medium. The publisher may associate any type or amount of auxiliary information with any desired print elements in the print medium. Auxiliary information may be static or dynamic and generally supplements an associated print element. Some or all print elements in a print medium may be designated selectable by the publisher.

When it is placed on the print medium receiving unit, the print medium can be geometrically "registered". That is, the print medium may be positioned on the print media receiving unit in a specified position and orientation. The accuracy of the placement of the print medium on the print medium receiving unit may vary depending on the number or size of selectable print elements on the page, or the distance between adjacent print elements. If there are many selectable print elements on a page of a print medium, then the registration accuracy needed is typically greater than if there are fewer selectable print elements per page. For example, if there is only one selectable print element per page in a magazine disposed on the print media receiving unit, then the registration of the magazine need not be substantially accurate. After entering the page number that the user is viewing into the print media receiving unit, the user could use a stylus to touch virtually any portion of the page to select the print element on that page. In these embodiments, the point at which the stylus touches the page need not be close to the selectable print element on the page. On the other hand, if there are many selectable print elements on the page, then more accurate registration is typically needed to ensure that the selectable print elements are properly registered with corresponding positions on the surface of the print media receiving unit. If, for instance, five pictures on a page are selectable, the five pictures can be registered to five selectable positions on the print media receiving unit. By doing so, the appropriate supplemental information is presented to the user upon the selection of one of the five pictures.

After it is on the print media receiving unit, the user may select a portion of the print medium. If appropriate, the page number that the user is viewing may be entered into the print media receiving unit. A selecting device such as a stylus or finger can be used to touch or point to printed matter such as text, pictures, or symbols in the print medium. An electronic detection system in the receiving unit may then determine that the user has made a section. In preferred embodiments, an electronic position determining system in the print media receiving unit can determine the position of the selected portion of the print medium.

In some embodiments, a print medium identifier or a user identifier, and information relating to the position of the selected portion is then sent to an information server computer. This information may be sent to a client computer which is external to the print media receiving unit, before being sent to the information server computer. In other embodiments, the client computer may be present in the print media receiving unit so that the print media receiving unit can be connected directly to a communication medium such as the Internet. In these embodiments, an intervening computer unit at the user's location is not needed to communicate with the information server computer. Regardless of which configuration is used, the print media receiving unit and the client computer are preferably located at a first location where the user is present, while the information server computer is at a second location (e.g., at a remote location) away from the user.

The information relating to the position of the selected portion may be the information in the selected portion, or may be the position of the selected portion in the print medium (e.g., the page that a selected print element is on and its relative or absolute position on that page). For example, information relating to the position of the selected portion may be the particular phrase, picture, etc. selected by the user. To determine the particular phrase, picture, etc. selected by the user, the print media receiving unit may contain an electronic map of the print medium disposed on the print medium receiving unit. The electronic map can be stored in a writeable memory in the print media receiving unit and can correlate print elements in the print medium with their location on the print medium. For example, the electronic map may correlate a particular print element to the page that it is on and its particular location on the page. The electronic position determining system can determine the position of a portion selected by a user, and a processor can determine the actual phrase, picture, etc. selected by the user using the position information and the electronic map. Accordingly, in some embodiments, the print media receiving unit can determine both the position of the selected portion as well as the actual phrase, picture, etc. selected by the user. Alternatively or additionally, the information relating to the position of the selected portion may be the relative or absolute position of the selected portion of the print medium.

In some embodiments, the information server computer may perform a task after receiving the information relating to the selected portion position. Any suitable task may be performed by the information server computer. For example, the information server computer may retrieve auxiliary information relating to the particular portion of the print medium selected by the user. The retrieved auxiliary information may then be transmitted to the user by using the information server computer. The transmitted auxiliary information may be received by a client computer at the user's location. The client computer may be internal to or external to the print media receiving unit, and may present the auxiliary information to the user in an audio or visual format.

When a user interacts with a print medium on a print media receiving unit, a one- or two-way communication channel can be created between a user (e.g., a reader of a publication) and entities having auxiliary information, auxiliary applications, interactive services, and control services relating to the print medium with which the user is interacting. The auxiliary information, auxiliary applications, interactive services and the control services can be accessed through the information server computer. The information server computer may be operated by a publisher of the print medium or a service provider contracted by the publisher.

In other embodiments, the server computer need not perform a task after the user selects a print element. For example, in some embodiments, the print media receiving unit can receive an electronic map and auxiliary information for a particular print medium from a server computer. The electronic map and the auxiliary information may be downloaded to a client computer at the user's site and then loaded into a writeable memory in the print media receiving unit. After the auxiliary information and the electronic map are received by the print media receiving unit, the user can interact with the print medium when it is placed on the print media receiving unit without further contact with the server computer. At a later date, the user may load different auxiliary information and electronic maps for different print media into the print media receiving unit. Consequently, in some embodiments, the user need not be in direct communication with the server computer when interacting with the print media receiving unit.

In an illustrative embodiment, a user may review a publication such as a magazine on a print media receiving unit and may want to know more about a particular subject in the magazine. The user may request back issues containing information relating to the particular subject by selecting the appropriate portion of the magazine. The information server computer is contacted and the information server computer may retrieve the back issues (or pertinent portions thereof) and may electronically transmit electronic copies of the back issues to the user's e-mail account or personal information manager (PIM). Alternatively or additionally, the publisher may send the back issues in hard copy form to the user through a non-electronic form of communication such as the U.S. mail.

As noted above, an electronic detection system can be used to determine that the user has made a selection. The electronic detection system is preferably an electronic position determining system which can be used to determine the position of portions of a print medium selected by a user. (Examples of suitable position determining systems are provided below.) A number of advantages are provided by using electronic detection system such as this. For example, by using a print media receiving unit and a position determining system, auxiliary information for any desired portion and for any desired print element in the print medium can be obtained. Since the location of a selected print element can be used to determine what the print element is (rather than a characteristic of the print element), the system can determine what the selected print element is regardless of the particular features of the print element. The ability to interact with the print medium is not dependent upon the characteristics of the print element. For example, the print elements in a print medium need not have a particular shape, configuration, or code to render the print medium interactive. Also, the presence of many print elements such as bar codes in a print medium decreases the aesthetic appeal of the print medium. Furthermore, eliminating the requirement of having specialized print elements saves publishers of print media a significant amount of time and expense as special printing processes are not needed to make a publication interactive. For example, special printing processes to print many barcodes or other machine readable symbols in a print medium are not needed in preferred embodiments of the invention.

Different types of print media may be used in embodiments of the invention. Suitable printed media may include "hard copy" printed media including publications, graphical patterns, game boards, photo albums, etc. Examples of publications include magazines, books, resumes, flyers, workbooks, manuals, newspapers, television guides, theater guides (or other performance guides), test forms, annual reports, direct mail items, music sheets, music or entertainment reviews, children's books, game or puzzle sheets, monthly statements, publications, etc.

The pages of the print media may comprise any suitable substrate material including paper or plastic. Print elements such as letters, figures, drawings, icons, symbols, pictures, etc. may be printed on the substrate material using any suitable ink, dye, or other print material. The print in the printed medium is preferably permanently affixed to the substrate material as is ink on paper. If the print medium is a book, the book may have a spine which permits the pages to lie flat when the book is open. An example of such a spine is one made from a spiral wire.

The print medium may even be a transparency sheet with printed matter. In some embodiments, a print medium such as a transparency may be disposed on a print media receiving unit. An image of the printed matter on the transparency on the print medium receiving unit can be projected onto a screen away from the print medium receiving unit using conventional methods. The user may interact with the projected image on the screen by selecting particular portions of the print medium on the print media receiving unit. If desired, the pages of the print medium can be turned automatically while on the print media receiving unit using mechanisms well known in the art. The images of the turned pages can be displayed on the projection screen, and the user can interact with print elements on the pages.

The print medium may have any suitable size. A suitable print medium may have planar dimensions of up to 20 inches by 12 inches, or larger (when open or closed). In other embodiments, the print medium may be about 10 inches by 12 inches, 8.5 inches by 11 inches, or 5 inches by 7 inches. Of course, the print medium may be smaller or larger than these sizes. The print medium may also include any suitable number of pages. For example, a print medium may have more or less than 100 pages. The print medium are preferably less than about two inches in thickness, but may be thicker.

Some or all of the print elements in a print medium may be rendered selectable. For example, more of less than one, two, or three print elements per page may be rendered selectable. If some print elements are rendered selectable and some are not, the selectable print elements may have a different appearance to the user than the non-selectable print elements. For example, highlighted, colored differently, bolded, or changed text (e.g., italics) might be rendered selectable while print elements on the page may not be rendered selectable. Also, certain portions of the print medium may be rendered selectable to generate one response, while other portions of the print medium may be rendered to generate a response of a different type. For example, after selecting highlighted or bolded text in a print medium such as a magazine, a response providing additional information about the highlighted or bolded text may be presented to the user. Other portions of the print medium, such as the border of the pages of a magazine, might be selected by the user and the system may respond to the selection in different manner or mode. For example, if the user selects these other portions, the print media receiving unit may respond by playing music or by providing instructions to the user (e.g., informing the user to select another portion).

FIG. 1 shows a system according to an embodiment of the invention. In this embodiment, client computers 71, 72 may be operatively coupled to an information server computer 80 through a communication medium 70 such as the Internet. The information server computer 80 may access an auxiliary information database 83 or a Web site 84 which has access to another auxiliary information database 85. The Web site 84 may be run on another information server computer (not shown). Auxiliary information from the auxiliary information database 85 can be sent to the client computer 71, 72 via the communication medium 70. This can be done directly or indirectly through the information server computer 80. The information server computer 80 may also have access to a print media database 82 containing electronically processed print media 82. Any of the databases of information can be present on a high-capacity information storage medium. Examples of information storage media include optical, magnetic, or electrical cartridges, disks, or compact disks.

Electronic content for the print medium may reside in a database 82 accessible to the information server computer 80. The electronic content for the print medium may include, among other things: (a) identifier information for the print medium; (b) electronic maps for the print medium; and (c) auxiliary information which may be embodied or present as static information, auxiliary applications, and/or content packages relating to predetermined print elements in the print medium.

The information server computer 81 may also include a host Web site 81. In preferred embodiments, the client computers 71, 72 may contact the information server computer 80 by contacting the host Web site 81. Contact can be made by entering the appropriate URL for the Web site 81 into the client computers 71, 72. Each of the client computers 71, 72 can be coupled to a print media receiving unit 73, 74. In other embodiments, the client computers 71, 72 may be included within respective print media receiving units 73, 74 so that the print media receiving units can be coupled to a computer network, without an intervening local computer unit. Various output devices (e.g., display devices, audio devices) and input devices (e.g., keyboard, mouse, stylus) (not shown) can be operatively coupled to the client computers 71, 72 or the print media receiving units 73, 74 for the user to provide and receive information from the system.

The information server computer used in the system is typically a powerful computer or cluster of computers. For example, the information server computer can be a large mainframe, a minicomputer cluster, or a group of servers functioning as a unit. For instance, the information server computer may be a database server coupled to a Web server. Moreover, the information server computer can behave as a single computer which services the requests of one or more client computers. The information server computer can retrieve specific information from an information storage medium on or accessible to the information server computer. Client computers can communicate with the information server computer through the Internet and optionally through one or more ISPs (Internet service providers). The client computers in the system typically have less memory and less computing power than the information server computer.

Figure 2:
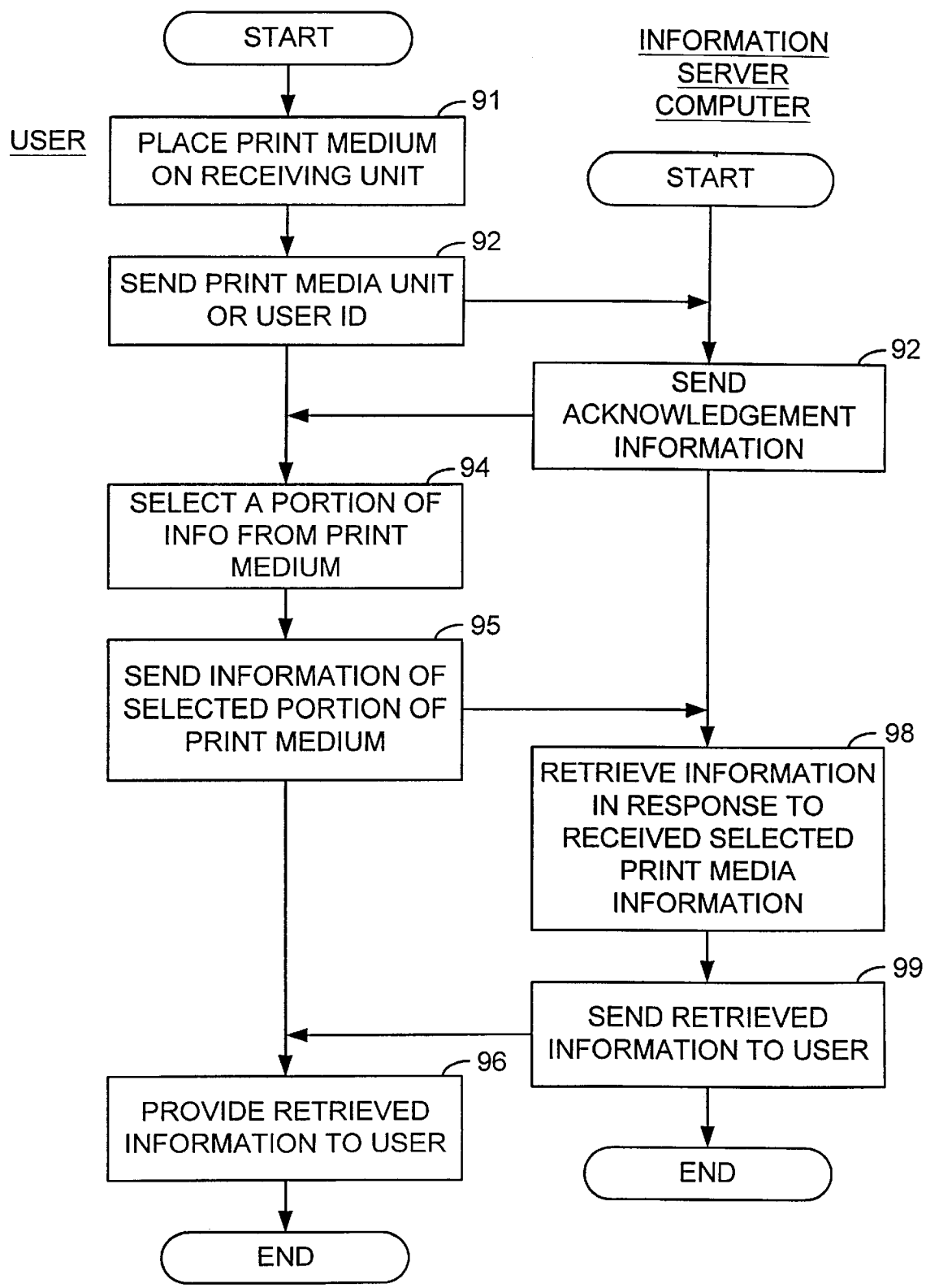
FIGS. 2 to 4 show flowcharts illustrating embodiments of the invention.

An illustrative method embodiment can be described with reference to FIGS. 1 and 2. A user can place a print medium on a print media receiving unit 73 (step 91). The user may manually or automatically enter an identifier for the print medium, and a user identifier or a print media receiving unit identifier, into the print media receiving unit 73 or a client computer 72 coupled to the print media receiving unit 73. For example, a machine readable symbol may encode an identifier for the print medium. The machine readable symbol can be scanned into the system so that the identifier for the particular print medium is entered.

The location of the information server computer 80 may also be entered into the system so that the identifiers can be sent to an information server computer 80. For example, the print media receiving unit 73, the client computer 72, or the print medium may contain or receive a URL for the particular information server computer 80 to be contacted. The URL can be used by the print media receiving unit 73 or the client computer 72 to establish communication with the information server computer 80. The client computer 72 can then transmit the identifiers to the information server computer 80 via the communication medium 70. Preferably, the client computer 72 contacts the information server computer 80 by first contacting a host Web site 81 residing on the information server computer 80. After receiving the identifiers, the information server computer 80 can send an acknowledgement to the client computer 72 or the print media receiving unit 73 that the identifiers have been received (step 97).

Some or all of the electronic content for the print medium may be sent to the user after the identifier information is received by the information server computer 80. For example, electronic content in the form of a content package for the print medium may be downloaded to the user's client computer 72 or the print media receiving unit 73. The downloaded information may then be transferred to a writeable memory device (not shown) operatively associated with the print media receiving unit 73.

In some embodiments, the downloaded information includes an electronic map correlating the print elements in the print medium to their location in the print medium, and auxiliary information for the print elements. In some of these embodiments, further information need not be downloaded from the information server computer for the user to interact with the print medium. The auxiliary information associated with the print elements in the print medium may be stored in a writeable memory device associated with the print media receiving unit. The print media receiving unit can then present auxiliary information stored in the writeable memory to the user after the user selects a print element in the print medium. This can be done without further substantial communication with the information server computer 80. In these embodiments, the user can interact with the print media receiving unit 73 without being in direct communication with the server computer 80.

In other embodiments, only a portion of the electronic content for the print medium need be downloaded to the user for the user to interact with the print medium. For instance, the auxiliary information relating to print elements in the print medium and the electronic map correlating the print elements to their location need not be downloaded to the user. The auxiliary information and/or electronic map may be at a location away from the user's site (e.g., in a print media database 82). Illustratively, the user can select the name of a company on a page in a print medium. An electronic position determining system associated with the print media receiving unit 73 determines the position of the selected company name. The positional information is transmitted from the print media receiving unit 73 to the client computer 72, which in turn can transmit it to the information server computer 80. Using a previously received print medium identifier, an electronic map for the print medium, and the received position information, the information server computer 80 determines that the company name from a database has been selected by the user. The information server computer may then retrieve auxiliary information relating to the company name, and the auxiliary information can be sent to the user.

Again with reference to FIG. 2, the user may use a stylus or other selecting device to select portions of the print medium (step 94). When selecting a print element, the user can use the stylus to contact or nearly contact a print element such as a word, phrase, picture, etc. on the print medium. After a selection is made, information relating to the position of the selected portion of the print medium is then sent from the print media receiving unit 73 to the information server computer 80 (step 95). For example, as noted above, information of the location of the selected portion may be sent to the information server computer 80 or the information of the actual selected print element may be sent to the information server computer 80.

The information server computer 80 may then perform a task after receiving information relating to the position of the selected portion of the print medium. For example, the information server computer 80 may retrieve auxiliary information for the user (step 98). The information server computer 80 can retrieve the information by contacting an auxiliary information database 83 or another Web site 84 having access to another auxiliary information database 85. The retrieved information is then sent to the print media receiving unit 73 and is provided to the user (steps 96, 99). The retrieved auxiliary information may be provided to the user in an audio or visual format.

The auxiliary information retrieved for the user may comprise any suitable information. Suitable information includes background information, factual information, supplemental information, or other information related to the print element selected by the user. For example, a user may obtain more information about an advertised item pictured in a publication or may want to order the advertised item. By selecting a print element such as an image of the advertised item in the publication, the user can cause the information server computer to send auxiliary information such as the price or availability of the item to the user.

The auxiliary information for a print medium may correspond to the identifier for print medium and may be stored according to the identifier. As noted above, the print medium identifier may be present or encoded at a standard location on the print medium. In some embodiments, the print medium identifier may be, for example, the title and date of publication of a print medium. In other embodiments, the identifier may be an alpha-numeric identifier which has been assigned to the print medium and can be encoded in a machine readable symbol. In some embodiments, the identifier may contain or have associated with it, the location (e.g., a URL) where the electronically encoded print information for the print medium can be received. For example, when a print medium identifier is entered (manually or automatically) into the system, the print media receiving unit or a client computer coupled to the print media receiving unit establishes contact with the information server computer which, in turn, contacts the database where the electronic content for the print medium resides. The information server computer can retrieve auxiliary information for the print medium, and then send it to the user.

The auxiliary information may be in any suitable form. The auxiliary information may be music or voice data that is capable of being converted to music or speech at the user's site. For example, in some embodiments, a speaker associated with the print media receiving unit can transfer music, voice or data into sound. The auxiliary information may also comprise text or other graphic material that can be displayed on a display device at the user's site. In some embodiments, the auxiliary information consists primarily of, or solely of, audio information.

The auxiliary information may even be provided by a computer application which is downloaded to the user's computer or print media receiving unit in response to the selected print element. The computer application may run on these or other components to provide the user with auxiliary information relating to the selected print element. In one example, the computer application may instruct the information server computer to query another Web server for additional information about the selected print element. In another example, the computer application may provide a multimedia presentation to the user, when it is run at the user's site.

In some embodiments, auxiliary applications may be downloaded to the print media receiving unit when certain symbols, e.g., on the print media or on the surface of the printed media receiving unit, are selected. For example, touching the stylus to a musical note symbol in a short boxed story on tempered musical scales, might cause an application program to be downloaded. The application program may be run on the print media receiving unit. When run, the program causes a device to illustrate the concept of different tonal tempering, and may ask the user to distinguish between half tones and whole tones.

A number of specific examples of auxiliary information can be provided. For example, in the case of a magazine or direct mail catalog, the auxiliary information may include weather or temperature information at particular travel destinations, stock quotes, inventory availability, or daily sales. For a news journal, the auxiliary information may include historical background to a published story, or related information, such as music or recorded speeches. In a magazine, an advertiser may provide supplemental information on the product for sale, and may also prompt the user for additional information. Using the system, the advertiser may offer the user an opportunity to purchase goods or may send an e-mail with additional information to the user. In yet another example, the publisher of a print medium capable of being used to play a game (e.g., a crossword puzzle) may provide auxiliary information about the game to be played (e.g., hints, facts about an identified word, etc.).

The auxiliary information sent to the user may also be embodied by a content package which can be sent by the information server computer. Content packages may be specifically tailored towards the user's interests or the particular nature of the print medium. Each content package may have associated with it, a computer application adapted to provide auxiliary information to the user and/or static information. For example, after a typical content package is sent to the print media receiving unit, the unit may ask the user to provide responses to a number of queries. Examples of requested information may include the user's opinion regarding a certain subject, answers to a quiz, etc. Information sent by a user may be called a "user package". For example, the user may send a user package of information to a publisher requesting that several books to be sent to the user's home and that the items be charged to the user's credit card.

Auxiliary information may also be information sent from another person at a different location, which may have been prompted, received, or transmitted by an information server computer. For example, the print medium may comprise one or more printed sheets with printed matter corresponding to a game which can be played by two players at two different locations. The players may operate print media receiving units and can interact with the game-containing print media at their respective locations. Information such as player moves can be transmitted between the players using an information server computer. Accordingly, multi-player games can be strategy games played in non-real or in real-time time across a network, for example, chess or Scrabble™ type games where each player's move is logged and then transmitted across a communication medium to the other player.

In another example, the print medium may contain a story on the stock market in which the user may obtain actual stock quotes if the stylus is directed (e.g., touched, pointed) to the stock symbols shown in the article. When the user selects a particular stock symbol on a page of a magazine on the print media receiving unit, information such as a current stock price for the selected company's stock can be sent to the user in an audio or visual format. Embodiments of the invention may thus obtain, real-time auxiliary information about certain print items which are time dependent in nature.

In an example, the user might use a stylus to select a picture of an ad for cars in a magazine. In response, the print media receiving unit may audibly recite downloaded information regarding the car in the selected ad. The user may, in response, select another region of the ad or a region of the print media receiving unit to request that additional information about the car be delivered to his e-mail account or regular mail box.

In another example, a publisher may want an article on books to have an interactive, i.e. "dynamic" audio content. The publisher may want to provide a downloadable application that allows the user to hear excerpts of the books in the article when one or more symbols are selected on the article.

Embodiments of the invention also provide the user with a variety of control services. For example, by selecting a print element on a print medium on a printed media receiving unit, the user could request that additional information be sent to his e-mail account. In another example, a user could also order products using the system. For instance, upon touching the stylus to an advertisement for a florist in a print medium, the user might request that a flower arrangement be sent. If the print medium is a catalog, the user could request that specific items featured in the catalog be delivered to his home by selecting appropriate print element in the catalog.

In some embodiments, the information server computer may be operated by a publisher, or a service provider contracted by the publisher. The publisher may prepare the publication for use in the print media information system by going through a series of processing steps. This processing may be performed at the information server computer site, for example, by a host entity. Alternatively, the processing can be performed at a site away from the information server computer. A publisher can process a print medium at his site and upload the processed print media data to a database for storage and retrieval by users. The processing consists of entering auxiliary information, auxiliary applications, or services associated with predetermined print elements (e.g., symbols) in the print medium in an information storage medium accessible to or on the information server computer. The print medium can be assigned a code that relates the print medium to the publisher content or information that the publisher wishes to use to supplement the print medium.

Figure 3:
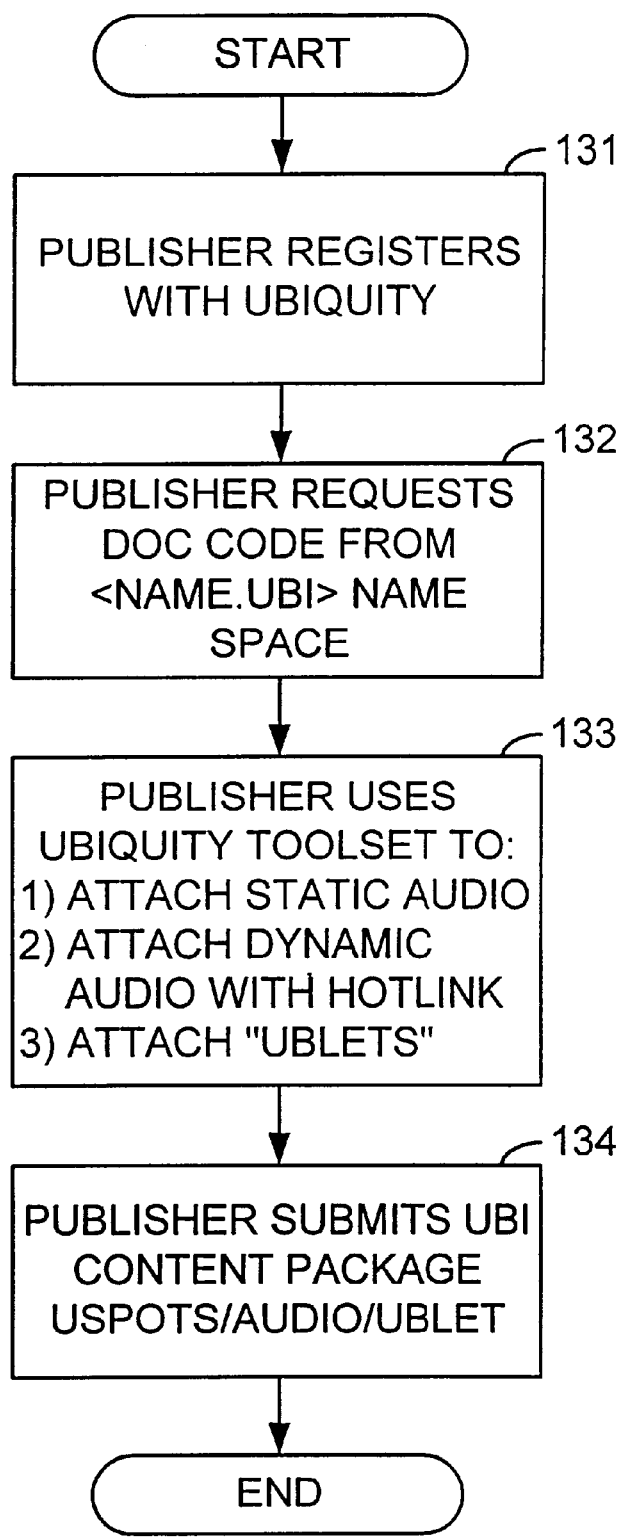

FIG. 3 illustrates a typical process for processing a print medium. First, a publisher contacts a processing center 131. The publisher obtains an identification code from the processing center that will represent that a particular print medium 132. The publisher may then obtain the appropriate software to convert the print medium into an electronic format 133. In the preparation process, attachments such as static audio, dynamic audio with links, and applets can be associated with selectable print elements in the print medium. The publisher may then upload this electronic content for the print medium to the information server computer. The information server computer may store the electronic content for the print medium in a print media database at, e.g., a publisher's site. Then, it can be downloaded by various users 134. In other embodiments, the print media database can be operated by a host entity which provides a print media processing service and/or electronic content storage service for many different publication entities.

Figure 4:
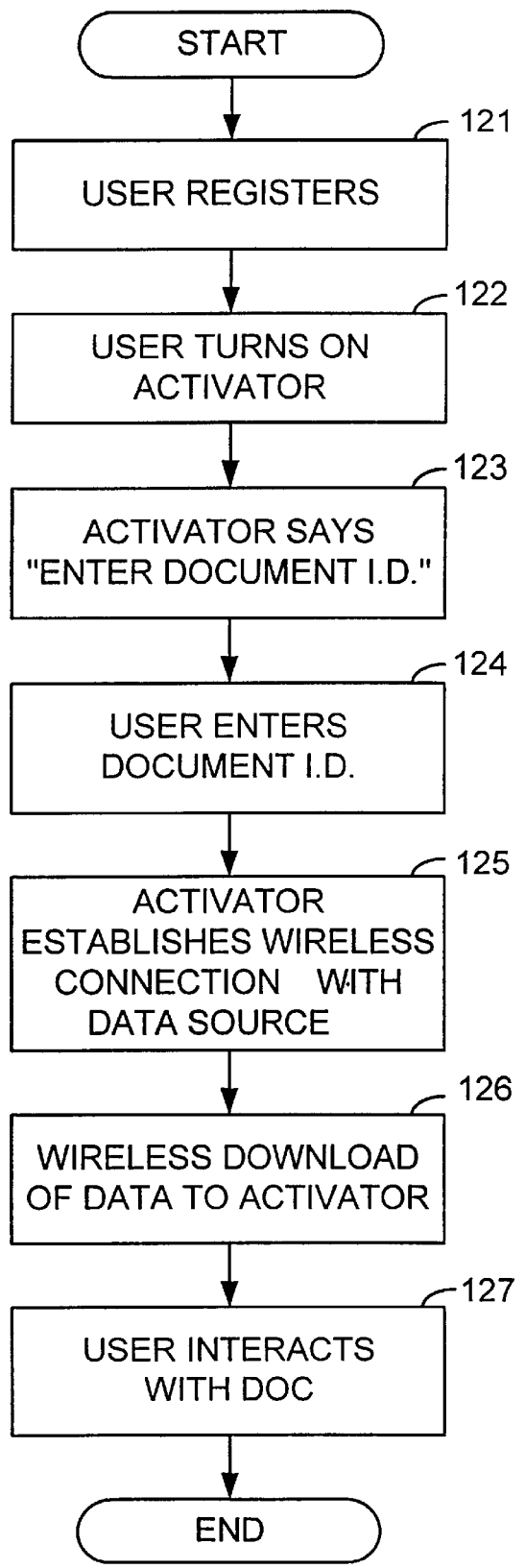

Preferably, the users register with a host entity before using the system. With reference to FIG. 4, after obtaining a print media receiving unit, the user establishes an account by registering with a host processing center 121. To establish the account, the user can provide the processing center with an identifier that is unique to the print media receiving unit the user is using. The print media receiving unit identifier is preferably associated with the print media receiving unit before it is distributed to the user. In other embodiments, a print media receiving unit identifier need not be used to set up an account. For example, the user can simply provide a user name and password to set up an account. Preferably, the user then provides the identifier, his name, address, phone number, optionally an e-mail address, optionally a list of interests, optionally credit card information, and other optional personal information to the host processing center. After the personal information is sent to the host processing center, it can be stored in a personal profile which is accessible to the information server computer. Whenever the user activates the print media receiving unit, the user can be identified to the information server computer and, if desired, any information retrieved according to the user's personal profile can be sent to the user.

The user then takes a print medium which has been previously processed by a publisher, and places it on a print media receiving unit which has been turned on 122. The print medium may have come to the user via a subscription or by purchase in a retail outlet. The print media receiving unit may instruct the user to place the print medium accurately on the print media receiving unit so it is geometrically registered properly. It may also prompt the user to enter the identifier of the publication 123. Alternatively, the identifier may be read by the print media receiving unit and entered automatically when the publication is placed on the print media receiving unit. An alpha-numeric entry device associated with the print medium receiving unit can be used by the user to enter an identifier code for the print medium manually into the system. Entry of the identifier may take place using the user's fingers or the stylus.

A print media receiving unit identifier or user identifier can be used to identify the user to the system. In either case, the identifier could be a code number or other symbol (e.g., an alpha-numeric symbol). Using the identifier, information can be retrieved for the user according to the user's personal profile and then sent to the user. Identifiers for both the print medium, the print medium receiving unit or the user can be sent to the information server computer. After receiving the identifier, the information server computer can send, e.g., a personalized greeting to the user using the corresponding print media receiving unit.

Using a print medium identifier in conjunction with a print media receiving unit identifier and/or a user identifier, a user's experience can be personalized. For example, after receiving a print media receiving unit identifier and a print medium identifier, the information server computer may download a suggested reading list based on the print medium on the print media receiving unit. The suggested reading list may be selected according to preferences in the user's personal profile which may be accessible to the information server computer. In another example, the user may have previously indicated an interest in wines in his personal profile. After receiving a magazine and placing the magazine on the print media receiving unit, a content package prepared according to the user's interests may be downloaded into the print media receiving unit. After receiving the downloaded content package, the user can be informed by the print media receiving unit that an article on wines is on a specific page in the magazine.

Figure 5:
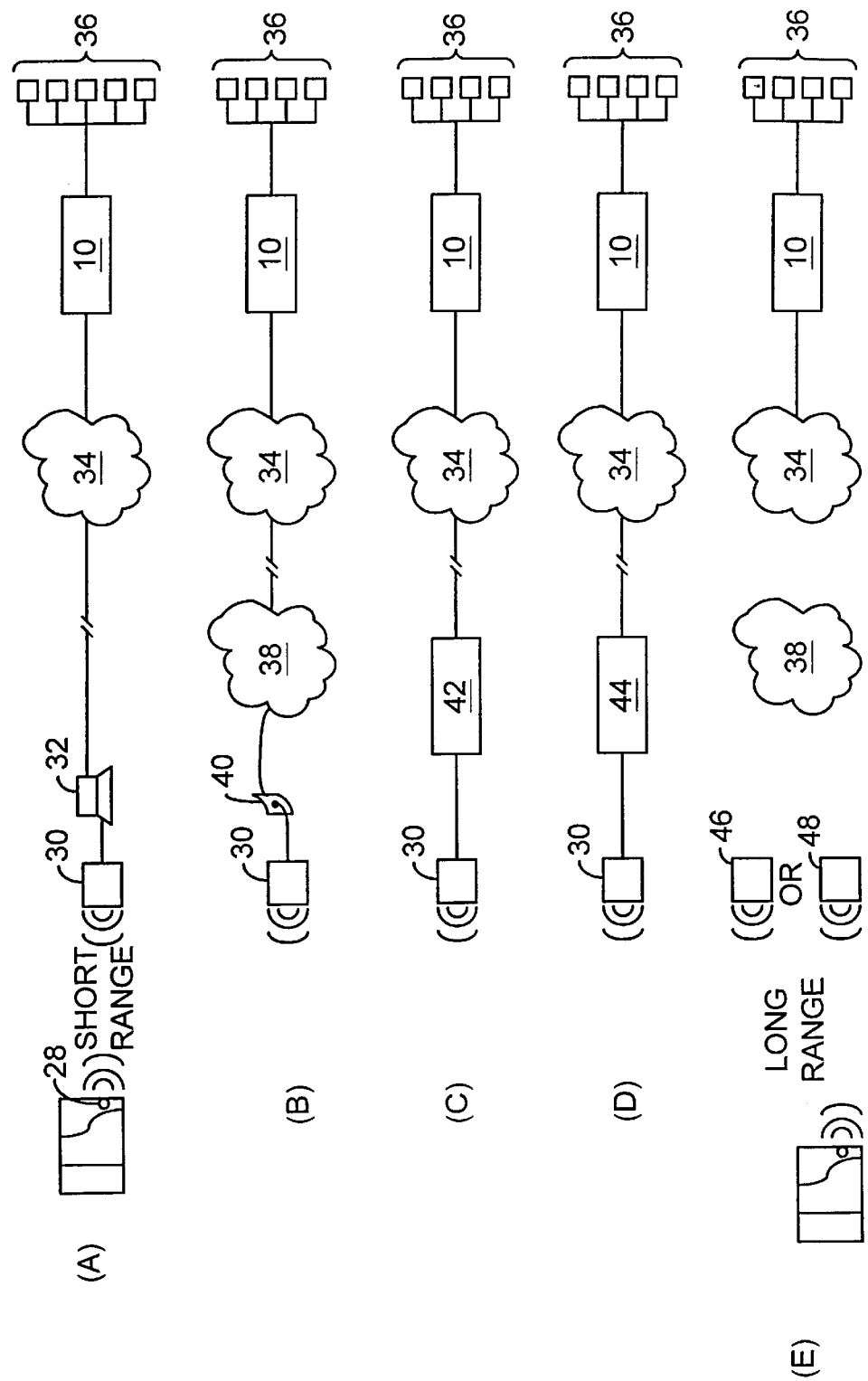
FIGS. 5(a) to 5(e) show schematic diagrams of system embodiments.

A number of different systems can be used to implement the above-described embodiments. FIGS. 5(a)–5(e) illustrate examples of such systems. In FIG. 5(a), the print media receiving unit 2 has a transceiver 28. The transceiver 28 links to a second transceiver 30 which in turn is coupled to a local external client computer 32. By local, it is meant that the client computer 32 and the transceiver 30 coupled thereto are close enough to the transceiver 28 in the print media receiving unit 2 so that information can be conveyed between the transceivers 28, 30 using normal short range RF signals. Typically this means that the print media receiving unit 2 and the transceiver 30 coupled to the client computer 32 are in the same home, office, office site, etc. The local external client computer 32 is typically a personal computer of any type with access to the Internet. The local external client computer 32 may be a laptop, local network server computer or other type of computer proximate the user's site. The local external client computer 32 is preferably connected to a communication medium such as the World Wide Web 34. In particular, the local external computer client 32 is connected to a Web site serviced by an information server computer 10. (The term "connected to the Web" is used in the common sense of the phrase and does not imply a direct electronic connection.) The connection may be through any of the commonly available connection services. For example, a modem can be used to call an Internet service provider (ISP) which in turn connects to a Web site through use of a browser. The information server computer 10 has access to a plurality of information sources 36 which contain auxiliary information, interactive services, and related applications associated with print medium. Information server computer 10 may also access Web sites having access to other information sources. The Web sites may be accessed through search engines, hyperlinks, etc. There is no practical limit to the number of information sources that the information server computer 10 can access.

FIG. 5(b) is similar to FIG. 5(a), except that in FIG. 5(b), a transceiver 30 is coupled to a phone jack 40. The phone jack 40 in turn is coupled to a public switched telephone network (PSTN) 38. The PSTN may be coupled to the Web 34 so that the information server computer 10 and the information sources 36 can be accessed.

FIGS. 5(c) and 5(d) are similar to FIGS. 5(a) and 5(b), except that a transceiver 30 is coupled to a game station 42 or an information appliance 44 such as palm-sized computer, wireless phone (e.g., cellular phone), personal digital assistant (PDA), etc. In some embodiments, the information appliance 44 may be thin client. In these embodiments, the game station 42 and the information appliance 44 may serve as client computers. Both the game station 42 and the information appliance 44 may be coupled to the Web 34 and the information server computer 10 and information sources 36 can be accessed.

The embodiments shown in FIGS. 5(a)–5(d) preferably use short range RF transceivers. However, RF transceiver links can be replaced by either infrared (IR) links or hardwired links. In certain situations it may be more convenient to use a hardwire coupling between the print media receiving unit assembly and the particular device to which it is coupled.

FIG. 5(e) illustrates, in the last row, a print media receiving unit 2 coupled to a wireless phone 46 or a PCS (personal communication system) node 48 via a transceiver 28 in the print media receiving unit 2. Long range RF signals can be used to link the node 48 and the phone 46 with the print media receiving unit 2. Although the wireless phone 46 and the node 48 are shown as being separate from the print media receiving unit 2, they may also be incorporated into the print media receiving unit 2. Regardless of the particular configuration used, the cell phone 46 and PCS node 48 may be operatively coupled to a network such as a PSTN 37 which is in turn coupled to the Web 34. The information server computer 10 and various information sources 36 can be accessed. In any of the embodiments, the print media receiving unit 2 may alternatively use a modem to allow it to access a communication medium such as the Web.

Print Media Receiving Units and Assemblies

The print media receiving unit may have any suitable shape or size. Preferably, it is in the form of a platform. Accordingly, a specific example of a print media receiving unit may be referred to as a "platform element". Platform-shaped print media receiving units have a substantially planar orientation and also have a substantially planar surface for receiving a print medium. The print media receiving unit may also be about the size of a laptop computer, palm sized, desk top sized, or drawing board sized. In some embodiments, the print media receiving unit may be in the form of a portfolio such as a leather or leather-like portfolio. The portfolio can be portable and can be carried by persons and can impart a professional appearance to the print media receiving unit.

In some embodiments, the print media receiving unit has a surface which is cooperatively structured to receive a print medium. The surface may form a depression defined by edges which are just larger than the planar area of an open book or magazine fitting within the depression. If the print medium is in the form of a book, the surface of the print media receiving unit may further have an additional depression conforming to the shape of the spine of the book. When the book is open, the spine lies in the depression and the pages of the book lie flat against the surface of the print media receiving unit. In other embodiments, the surface of the print media receiving unit need not be cooperatively structured to receive a print medium. For instance, a holder can be used to hold a print medium on the surface of the print medium receiving unit in a fixed position.

The print media receiving unit may be hinged at the center so that it can fold into a unit half, or a fraction of, its opened size. In use, the print media receiving unit is preferably opened and a print medium is placed on the open inner faces of the print media receiving unit. The print media receiving unit may also have one or more mechanical features that allow the print medium to be exactly positioned or registered on the print media receiving unit. The print media receiving unit may be structured so that when it is closed, it can enclose a print medium such as a book or a magazine therein. In these embodiments, the print media receiving unit can be configured so that a print medium placed on the print media receiving unit can remain in place when the print media receiving unit is folded.

The print media receiving unit may be formed using any suitable material. The print media receiving unit may be formed of plastic, cardboard, or other stiff material. The print media receiving unit may include a conventional leather or vinyl backing that is stiff enough to be used as a platform.

The print media receiving unit also includes an electronic detection system such as an electronic position determining system embedded therein. Using the position of the portion of the print medium selected by the user and an electronic copy of the print medium, the particular printed matter selected by the user can be determined by the system. For example, as noted above, the print media receiving unit may contain an electronic map and auxiliary information for the print medium disposed on the print medium receiving unit. An electronic position determining system can determine the position of a portion selected by a user, and a processor can determine the actual phrase, picture, etc. selected by the user using the position information and the electronic copy of the print medium. Accordingly, in some embodiments, the printed media receiving unit can determine both the position of the selected portion as well as the actual phrase, picture, etc. selected by the user. Alternatively or additionally, the information relating to the position of the selected portion on a page may be positional information such as the x-y coordinates of the selected portion on the page.

Information pertaining to the particular page which the user is viewing may also be entered into the print media receiving unit by the user so that the unit knows which page the user is viewing. For example, the user may use a stylus to select numbers on an alpha-numeric keyboard disposed on the print media receiving unit. In another embodiment, the stylus or other device can be used to scan the page number of the print medium. In yet another embodiment, a strip of numbers (0 to 9) may be present on the print media receiving unit and the user may select the page number using a stylus by selecting the corresponding combination of numbers. In yet another embodiment, an indicator such as a "go" circle may be present on the borders of the pages of the print medium. When the indicator is selected by the user, the position of the indicator can be determined by the electronic position determining system and that position may correspond to a particular page in the print medium.

Figure 8:
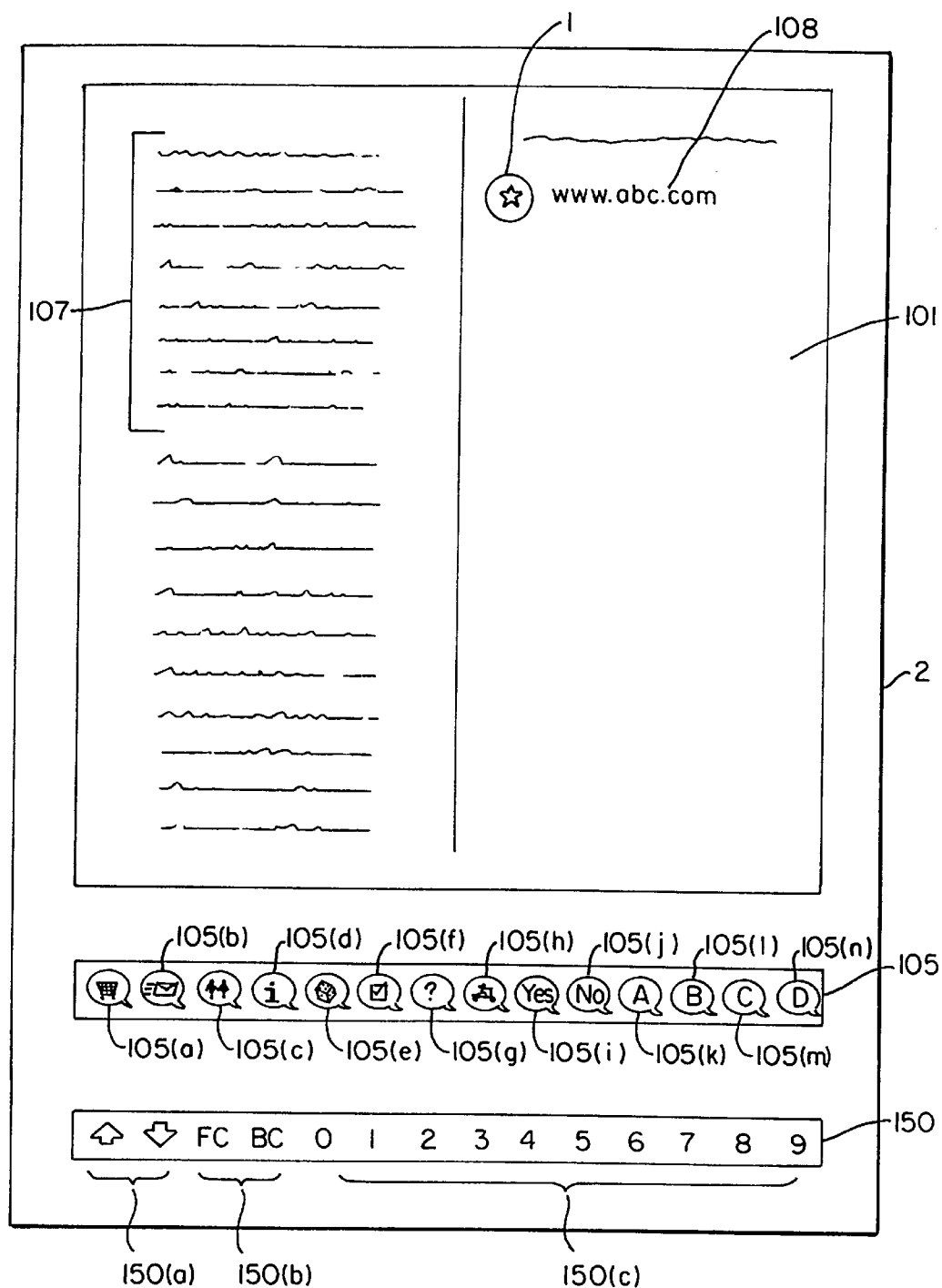
FIG. 8 is a plan view of a print medium on a print medium receiving unit embodiment.
Figure 9:
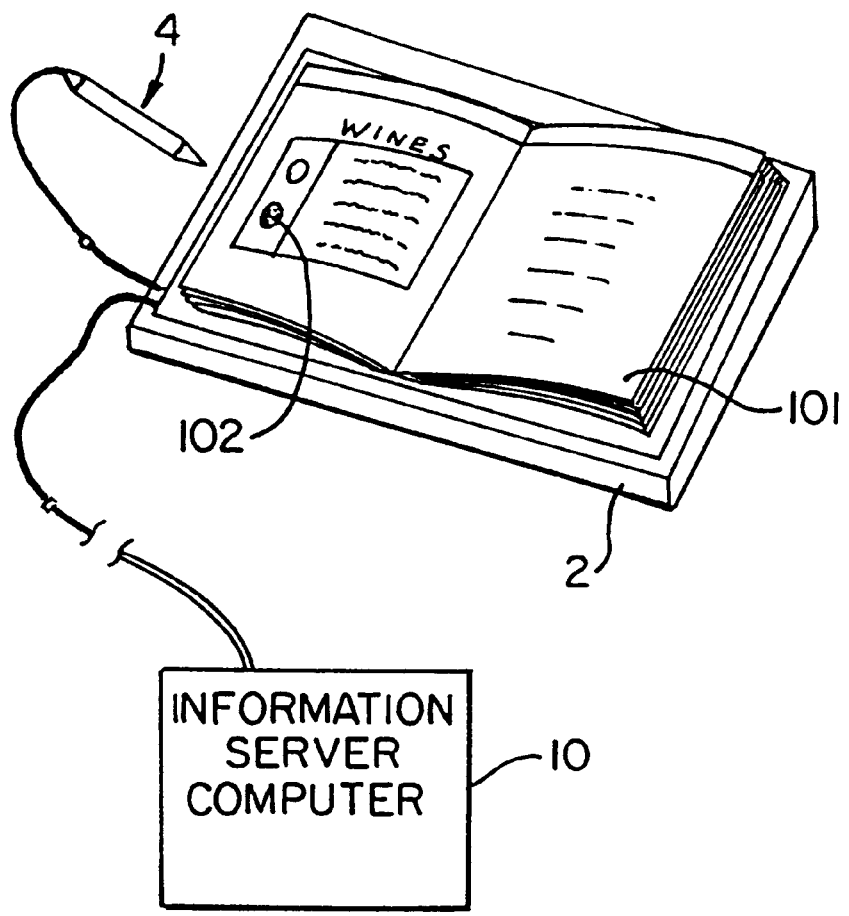
FIG. 9 is a three-dimensional view of a print medium on a print medium receiving unit embodiment.

Preferred electronic position determining systems include graphical location and position determining systems using an interactive stylus and an antennae system. For example, in an illustrative embodiment, a magazine may be placed on the print media receiving unit and the user may use a stylus or other device to select an advertiser's name in the magazine. Upon selection of the advertiser's name using the stylus, the graphical location and position determining system can determine that the user has selected the advertiser's name. The stylus and an antennae system embedded within the print media receiving unit may interact and determine the particular location of the printed matter selected by the user. The location of the printed medium and the print media receiving unit can be fixed relative to each other so that the particular location of printed matter on the printed medium corresponds to a similar location of the print media receiving unit. The degree of care taken to achieve overlap of an image, or selectable position, on the print material relative to the detector system in the print media receiving unit will depend on the resolution needed. For example, one region of a surface of a print media receiving unit may have many selectable positions very close together, while another region of the print media receiving unit surface may have few selectable positions. Higher resolution is needed for the former than for the latter circumstance. The resolution of the electronic position determining system can be varied according to the algorithm used to interpret the electric field map. In addition to using software to vary the spatial resolution from page to page, the software can interpret the electric field strength map to create a gradient in resolution from one part of a page to another. The top of the page, where perhaps only a few widely spaced selectable positions are located may have low resolution, so the print media may be only approximately positioned relative to the detector. In contrast, the lower portion of the surface may require high resolution in order to select icons positioned directly on (and thus not movable with respect to) the print media receiving unit. This is illustrated in FIG. 8. In yet other embodiments, software can modify the operational characteristics of the hardware in the graphical location and position determining system so that this gradient can be achieved. Further details of preferred graphical location and position determining systems are described in U.S. Pat. No. 5,686,705, U.S. Provisional Application No. 60/200,960 filed May 1, 2000 and U.S. patent application Ser. No. 09/574,499, now U.S. Pat. No. 6,661,405, filed May 19, 2000, all of which are herein incorporated by reference in their entirety for all purposes, and are assigned to the same assignee as the present application. In another example, the technology suitable for some components of a basic print media receiving unit can be found in a product called "LeapPad™" commercially available from LeapFrog, Inc. of Emeryville, Calif.

Other types of electronic detection systems can be used. For example, print media receiving unit may have a digital graphics tablet or a pressure sensitive surface upon which a print medium is disposed. Upon pressing the print medium and the underlying pressure sensitive surface, the position of the selected portion of the print medium can be determined. In yet another embodiment, a system using surface acoustic waves are measured at the edges of a glass plate and are used to calculate the position on the place that was selected by a finger or a stylus. In yet another embodiment, an optical detector can be used. The print media receiving unit may include a frame around a flat surface. The print medium can be disposed under the frame and on the flat surface. An array of light emitters and detectors can be around the inner edges of the frame. When a finger or a stylus is near the print medium and interrupts light coming from the light emitters, the position of the selection can be determined.

The print media receiving unit may also include a writeable memory device. In some embodiments, it contains a programmable ("flash") memory or other volatile memory device. The writeable memory device can store any suitable information. For example, electronic maps of print media, as well as auxiliary information for selected print elements in the print media can be stored in the writeable memory device. The writeable memory device may be embedded within the print media receiving wit, may be external to the print media receiving unit, and/or may be temporarily insertable within the print media receiving unit If it is temporarily insertable within the print media receiving unit, it may be in the form of a cartridge, disk, memory stick, etc. Preferably, such insertable writeable memory devices may also-be insertable within a client computer.

Any of the components in the systems, assemblies and print media receiving units according to embodiments of the invention may include wireless communication links. The links may be provided by, for example, radio frequency or infrared frequency links. In one example, the print media receiving unit may associated with (e.g., contain or be coupled to) a transceiver and a local computer such as a client computer may also have a transceiver. Communication can occur between these components via a wireless link between the transceivers.

The print media receiving unit may include any suitable software. The print media receiving unit assembly may contain word processing software, voice recognition software, position determining software, etc.

Any suitable input devices may be associated with the print media receiving unit. Examples of input devices include a stylus, keyboard, mouse, laser pointer, trackball, touchpads, etc. Preferably, an input device such as a stylus is electrically coupled to the print media receiving unit. The stylus may be tethered and electrically coupled to the print media receiving unit, e.g., through a cable or through a wireless link to form a print media receiving unit assembly.

Other data input devices may be buttons or selectable symbols (e.g., icons, abbreviations) on the print media receiving unit, which may be selected by the user to obtain auxiliary information. For instance, the selection of certain symbols may cause certain types or modes of auxiliary information to be delivered to the user. The symbols may be in a legend on the print media receiving unit so that the user can easily reference selectable items. As the user browses a print medium such as a newsmagazine disposed on a print media receiving unit, the user may touch a stylus to various items of interest on the page. For example, if a news story is accompanied by a picture of a newsmaker and the reader touches the stylus to a displayed icon (e.g., a speaker icon) on the print medium receiving unit, auxiliary audio information about the newsmaker may be provided to the user.

Any suitable audio or visual output devices may be associated with the print media receiving unit. Examples of visual output devices include a display devices such as video screens, monitors, televisions, or LCDs. The audio output devices may produce primarily audio output. Examples of audio devices include speakers, earphones, headphones, voice synthesizers, etc. Audio output devices such as earphones and headphones can be connected to the print media receiving unit through an audio jack. The print media receiving unit preferably contains voice generating technology (e.g., a synthesized voice), in addition to voice streaming or voice pass-through capability. When the stylus touches words or other printed matter on the print medium, an audio device in or coupled to the print media receiving unit can provide a high quality human voice, music, and/or sound effects.

Figure 6:
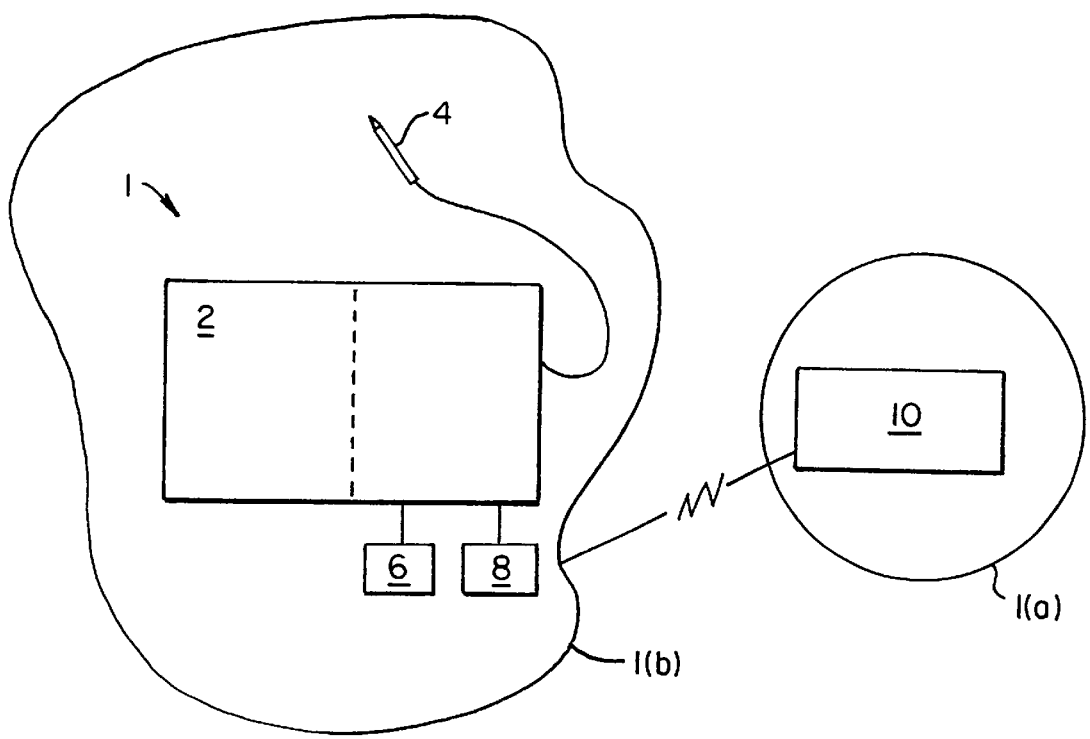
FIG. 6 shows a schematic diagram of a system embodiment.

FIG. 6 shows a schematic representation of a print media information system embodiment including a more detailed schematic representation of some print media receiving unit components. The system comprises a print media receiving unit assembly at a first user location 1(*a*) and an information server computer 1(*b*) at a second location 1(*b*). The second location 1(*b*) may be remote from the first user location 1(*a*).

The print media receiving unit assembly may include any suitable number of components. As shown, the print media receiving unit assembly may include a platform-shaped print media receiving unit 2, a stylus 4, a processor 6, and a writeable memory storage device 8. The stylus 4 may be operatively coupled to, and in operative association with, the print media receiving unit 2, which is preferably portable. A wired or wireless link may be present between the stylus 4 and the print media receiving unit 2.

The processor 6 may be a microprocessor and is preferably disposed within the print media receiving unit 2, but may also be external to the print media receiving unit 2. A number of operations may be performed by the processor 6. For example, the processor 6 may be a component in an electronic position determining system (not shown) which can be used to determine the location of a selected portion of a print medium disposed on the print media receiving unit 2. The processor 6 may store instructions for calculating the position of the stylus 4 over the print media receiving unit 2. Alternatively or additionally, the processor 6 may serve as a client computer which can receive or transmit data to and from the information server computer 10. Although processor 6 is shown as being external to the print media receiving unit 2, the processor 6 may be contained within, and/or form part of, the print media receiving unit 2.

A writeable memory storage device 8 is operatively coupled to the processor 6 and an information server computer 10. The writeable memory storage device 8 may be external to, or disposed within the print media receiving unit 2. If the writeable memory storage device 8 is disposed within the print media receiving unit 2, it may be removable or non-removable from it. If it is removable, it may be in the form of a disk, cartridge, or memory stick. A removable memory storage device 8 can be insertable and/or receivable by the print media receiving unit 2 and also by an external computer (not shown) which may serve as a client computer communicating with the information server computer 10. The writeable memory storage device 8 my also be in the form of disk drive, flash memory or other information storage device. Any of these forms may be internal to, or external to, the print media receiving unit 2.

A stylus 4 may be tethered to a print media receiving unit 2 to form a print media receiving unit assembly. While the stylus 4 is illustrated as being mechanically coupled to the print media receiving unit 2, it can also be coupled through a wireless link. The stylus 4 may contain electronics that are operatively coupled to the client computer 6 and the electronics in the print media receiving unit 2. In other embodiments, the stylus 4 may be free of electronics and may simply serve as a mechanical selecting device.

Figure 7:
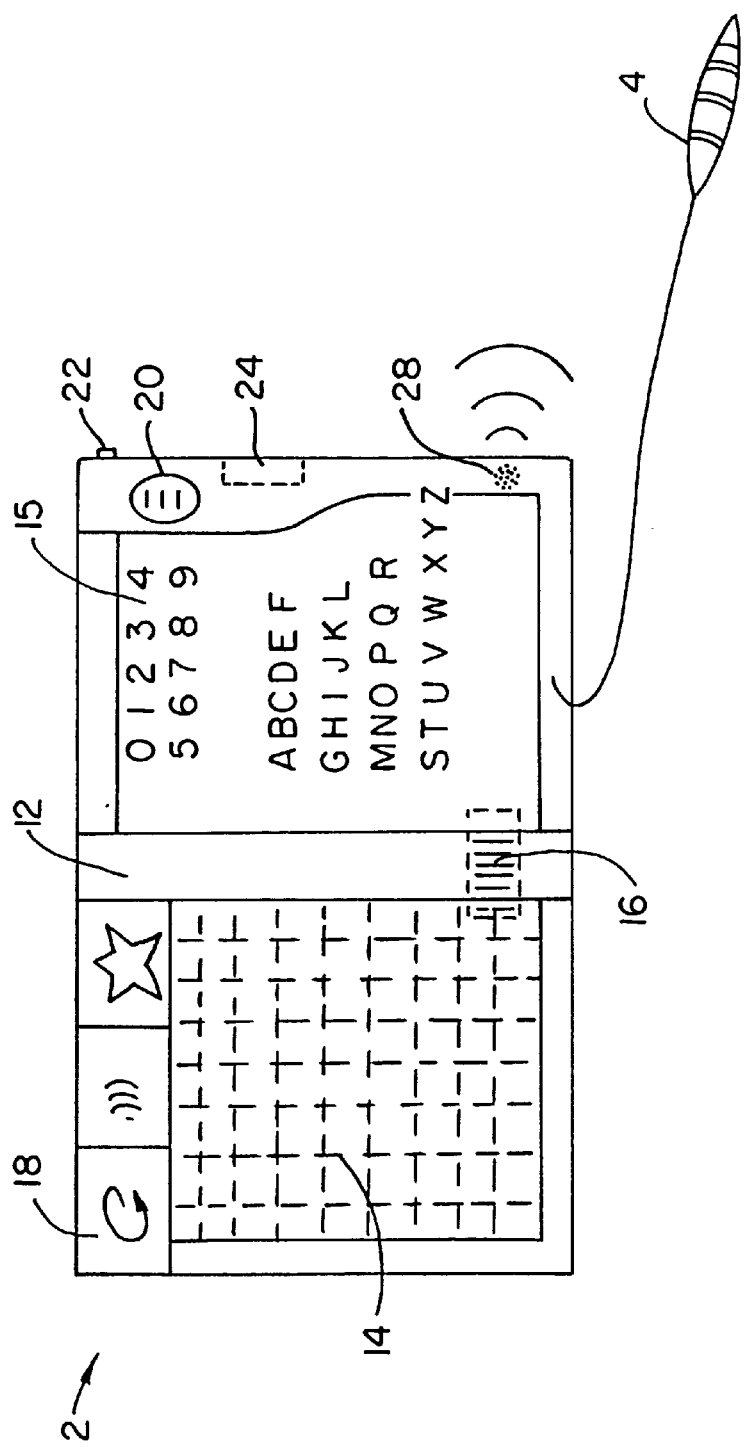
FIG. 7 is a schematic diagram of a print media receiving unit.

FIG. 7 shows a schematic diagram of the print media receiving unit 2. The print media receiving unit 2 shown has a hinge 12 in the center that separates two panels and allows the print media receiving unit 2 to fold into a closed position when it is not in use. Electronic elements 14 forming part of the electronic position locating system are embedded under the print media receiving unit on each side of the hinge 12, and are shown by dashes on the left hand side of the print media receiving unit 2. An optional sliding positioning piece 16 may be used to stabilize and restrain the print media. Any suitable positioning structures can be used. For instance, it is also useful to use notches along the border of the print media receiving unit 2 to position a print medium on the print media receiving unit 2 in a fixed position. An alpha-numeric input region 15 can be provided on the print media receiving unit 2 to permit a user to enter data into the receiving unit.

On the left hand panel of the print media receiving unit 2, three examples of icons 18 are illustrated. These icons might be used by the user to make special requests. For example, if the user desires additional information about a topic be sent to his or her e-mail address, the user may select a topic in a magazine on the print media receiving unit and may later select an e-mail icon. After selecting the e-mail icon, the auxiliary information retrieved by the information server computer can be sent to the user's e-mail account. Alternatively, the user might touch the icon 18 to receive an audio prompt regarding e-mail. Any number of icons could be used for additional options, and the icons may be printed on a surface of the print media receiving unit 2.

The right side of the print media receiving unit 2 includes an optional speaker 20 which is physically integrated into the print media receiving unit 2. There is also a earphone jack 22, for use if quieter operation if desired. In use, the user may place the tip of stylus 4 on a portion of the print medium and auxiliary information relating to the selected portion can be sent to the print media receiving unit 2 and may be audibly recited to the user. A wireless transceiver such as an RF transceiver 28 can be coupled to or embedded in the print media receiving unit 2. The RF transceiver 28 may be used to couple the print media receiving unit 2 to an information server computer or to a client computer which contacts the information server computer.

Auxiliary information can be loaded to or from the print media receiving unit 2 using a writeable memory such as a flash memory cartridge (not shown) or other transferable information storage media. A flash memory cartridge, for example, fits in a slot 24 at the side of the print media receiving unit 2. The cartridge may contain auxiliary information.

As noted above, a gradient of selectability may be provided so that resolution of the selectability of the selectable elements may be greater at one region of the print element receiving unit than another. For example, with reference to FIG. 7, the icons 18 are larger than, and have more distance between adjacent icons than the alpha-numeric elements 15 on the print media receiving unit. Both the alpha-numeric elements 15 and the icons 18 may be printed on the surface of the print media receiving unit 2. The number of selectable positions at the region where the alpha-numeric elements 15 lie is greater than the number of selectable elements where the icons 18 lie. Accordingly, in embodiments of the invention, a gradient of selectability may be provided to the print media receiving unit 2. Preferably, the gradient of selectability can be changed by modifying the location detection software used in the receiving unit 2 without any hardware modifications.

Another embodiment view of another print media receiving unit embodiment is shown in FIG. 8. In FIG. 8, a print media receiving unit 2 has a print medium 101 disposed on it. The print media receiving unit 2 may have a menu bar 105. The menu bar may have the following icons: an icon to purchase a product 105(*a*), an icon to send an e-mail to the user's account 105(*b*), an icon to send an e-mail to another person 105(*c*), an icon to obtain more information 105(*d*), an icon to play a game 105(*e*), an icon to take a poll 105(*f*), an icon for help 105(*g*), an icon to send information through regular mail 105(*h*), icons 105(*i–j*) for answering yes or no in response to questions, and icons corresponding to potential answers provided by a user 105(*k–n*). A data entry bar 150 may be present and may include: elements which can be selected to increase or decrease the volume 150(*a*), elements by which the user can inform the unit 2 that he is viewing the front cover (FC) or back cover (BC) 150(*b*), and numerical elements 150(*c*) for the user to enter in the page number(s) being viewed. As shown, the menu bar 105 and the data entry bar 150 are displayed to the user while the print on the print medium 101 is displayed to the user.

A number of functions can be performed with the menu bar 105 and the data entry bar 150. For example, in some embodiments, a portion of text 107 can be selected can "cut" by passing a stylus (not shown) over the portion of text 102. This cut text 107 can then be sent to the user's e-mail account by selecting the e-mail icon 105(*b*) on the print media receiving unit 2. A selectable symbol 110 may be present on the print medium 101 to indicate to the reader that the symbol is selectable. Unlike a machine readable symbol such as a bar code, the symbol 110 may be aesthetically pleasing since its selectability does not depend on the particular geometry of the symbol 110 itself. In this instance, the selectable symbol may be associated with a URL (uniform resource locator) 108. The user may select the symbol 110 and then select the e-mail icon 105(b) to send an e-mail to the user with a hyperlink to the URL.

Although the menu bar 105 and the data entry bar 150 are shown as being on the print media receiving unit 2, they could also be on the print medium 101. It is preferable, however, to have one or both of the menu bar 105 and the data entry bar 150 on the print media receiving unit 2. For example, by providing these bars on the print media receiving unit 2, the bars need not be printed on the print medium and need not clutter the appearance of the print medium. Moreover, by providing these bars on the print media receiving unit 2, fewer selectable print elements per page can be provided. As noted above, when fewer selectable print elements per page are provided, the registration accuracy needed when placing a print medium 101 on the receiving unit 2 is decreased.

EXAMPLES

Example 1

In one example, with reference to FIG. 8, the print media receiving unit 2 is designed to accommodate a magazine 101 such as Time™ magazine. The magazine has been prepared by a publisher, and data of the prepared publication is entered into the information server computer 10. The information server computer 10 is preferably capable of obtaining auxiliary information which may relate to the print elements in the magazine being viewed by the user. The magazine may have been prepared for the system in advance of the user's receipt of the magazine or may be prepared after the receipt of the magazine. When the magazine is prepared, the magazine has an identifier such as a code and/or a publication name and date, as well as auxiliary information such as audio files associated with print elements in the magazine.

To use the prepared magazine, the user locates the identification code printed on the magazine and enters it into the print media receiving unit using the alpha-numeric pad on the print media receiving unit. The print media receiving unit communicates with an information server computer via a Web site on the information server computer. This may be done using an intermediate client computer, or may be done using a processor in the print media receiving unit which can serve as a client computer. Data for the specific user, the print media receiving unit, and the specific magazine is uploaded into an information medium accessible to the information server computer. The print media receiving unit is registered at the information server computer using the identifiers and is associated with a user profile. In the personal profile, the user may have previously provided personalized information to the information server computer expressing an interest in wines.

Data is sent from the information server computer 10 to the print media receiving unit 2. A speaker in the print media receiving unit or sounds coming from an earphone coupled to the print media receiving unit greets the user by name and recites the name of the magazine being viewed. Having previously expressed an interest in wines, the sound of a voice coming from the print medium receiving unit brings the user's attention to an article on wines in the magazine. The user turns to the wine article and sees a boxed inset on pinots, describing several different processing methods for pressing the grapes. A stylus 4 is used to select a symbol 102 in the insert box to and hear information on details of the different pressing methods described by a wine maker. The selection information may be sent to the information server computer 10 and the information server computer 10 may retrieve auxiliary information regarding wine making. For example, sound files can be downloaded into the print media receiving unit 2. The user can be asked by the system if he would like to order sample bottles made by each of the processing methods shown in the magazine. Using the stylus 4, the user responds affirmatively and selects a number of bottles displayed in the magazine 101 for purchase. The print media receiving unit 2 may respond by displaying or reciting the price to the user. Using the print media receiving unit 2, the user may inform the information server computer 10 to have the shipment sent to a work address to avoid having the shipped bottles sit in the afternoon sun until the end of the day.

In some embodiments, the user may be tested on the subject matter provided by the article in the print medium. The user may be given a pop quiz such as a multiple choice test to test the user on his retention of the subject matter of the article in the print medium. For instance, in this particular example, the user can be tested with multiple choice questions on the subject matter of the wine article recently read. Consequently, embodiments of the invention can assist a user in retaining information that he has read.

In some embodiments, the user may also select a symbol to have the print media receiving unit recite the main points of the article before the user reads the article. In this way, the user can listen to the key points of the article before deciding to spend the time to read the article. For instance, in this particular example, the user can select a symbol which lets the user listen to a summary of the article on wines. After listening to the summary, the user can determine if he wants to read the article.

Example 2

The printed media used may comprise strong, long-lasting plastic sheets containing game board designs along with printed codes specifying the game and level of interaction. For example, the printed medium may resemble a chess board and printed icons indicating different difficulty levels (e.g., levels 1 through 5) may be listed in the margin of the printed medium. A level of skill can be selected by the user. The printed medium may be placed on a print media receiving unit and chess pieces can be placed on the printed medium. Position sensors in the print media receiving unit can sense the position of particular chess pieces. This location information can be transmitted to the information server computer. When the user moves a chess piece, the print media receiving unit can determine the new location of the chess piece and the new location information can be sent to the information server computer. Consequently, in these game embodiments, the user may play a game with another player or may play a game with the information server computer. The user has a choice of playing in real time or playing by logging game moves and sending the move to another player who will pick up the game at a convenient time to check an opponent's last move, and subsequently to enter a move.

Example 3

A person may electronically prepare a personalized birthday card to make certain items on the birthday card selectable when the birthday card is placed on the print media receiving unit. For example, the birthday card when placed on a print media receiving unit, the user may select items on the birthday card and the print media receiving unit may respond by generating a special song or reciting a personal spoken message from the sender. The card may offer different gift certificates to the user and may choose a gift certificate from the gift certificates printed on the card. Upon selection of a gift certificate, the gift certificate can be automatically sent to the user.

Example 4

A family in which members live some distance from one another could share a photo album, with associated spoken annotations. Family members can obtain a user-oriented toolkit to electronically process the photo album to make certain elements of the photo album selectable when it is on a print media receiving unit. Upon selection of certain elements in the photo album, new photos and comments may be presented to the user. Each time a family member places his album in the print media receiving unit, it would download the latest photos and comments entered by any other family member.

Example 5

Information can be requested real time using embodiments of the invention. For example, the user can touch a map on the print media receiving unit to hear weather conditions or may place a TV guide on the print media receiving unit to hear reviews or viewing times for a listed program. The user may also select portions of a printed medium on a print media receiving unit to listen to excerpts of recorded music from a play, movie, or compact disc.

Example 6

A print medium can be placed on a print media receiving unit. The print medium may display ads for service businesses such as a realtor or an auto-dealer. By touching portions of the ads, the user can request that the realtor or auto dealer send information to the user by e-mail, conventional mail, or phone. Information on a single topic, like cars, catalogs, or magazines could be saved for later comparison. Contests or sweepstakes could be carried out with a real time response using embodiments of the invention.

Example 7

Users could register for events by filling in processed forms that were received by conventional mail. They can be placed on a print media receiving unit and the elements of the forms can be selected to provide registration information to the information server computer.

Example 8

A user places a magazine on the print media receiving unit, and touches the stylus to, e.g., an advertisement for a theater show in the magazine, electronics in the print media receiving unit will identify the print item selected by the user. The selected information can be sent to an information server computer which retrieves information from an information source such as an information database and sends it to the user. The information sent to the user may be ticket information (e.g., prices) and show schedules. The sent information may be digital and may be in the form of a sound file or text file. After the print media receiving unit receives the data transmitted from the information server computer, a speaker in the print media receiving unit audibly recites the days certain tickets are available and their price to the user. The user may also purchase the tickets by contacting the information server computer using the print media receiving unit.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention

We claim:

1. A print media information system comprising:
   (a) a portable print media receiving unit assembly including
      (i) a platform including a surface and a print medium on the surface,
      (ii) an electronic position determining system capable of determining a position of a selected portion of the print medium using an electronic map that correlates print elements in the print medium with their locations in the print medium when the print medium is disposed on the surface, wherein the electronic position determining system includes a processor,
      (iii) an audio output device coupled to the processor, and
      (iv) a writeable memory device coupled to the processor, wherein the audio output device and the processor are included in the platform in the portable print media receiving unit assembly; and
   (b) an information server computer adapted to send auxiliary information to a user via the Internet after receiving the information relating to the position of the selected portion of the print medium, and wherein the information server computer is also adapted to transmit the electronic map that correlates the print elements in the print medium with their locations in the print medium to the user via the Internet for use in the portable print media receiving unit assembly,
   wherein the writeable memory device is adapted to receive and store the auxiliary information from the information server computer and store the electronic map that correlates the print elements in the print medium with their locations in the print medium.

2. The print media information system of claim 1 wherein the information server computer is adapted to perform a task after receiving the information relating to the position of the selected portion of the print medium.

3. The system of claim 2 wherein the task comprises retrieving auxiliary information relating to the selected portion of the print medium; and
   wherein the audio output device is adapted to communicate the auxiliary information.

4. The system of claim 1 wherein the print media receiving unit assembly further comprises a stylus, and wherein the processor is programmed to identify an area where the stylus is positioned.

5. The system of claim 2 wherein the task comprises retrieving auxiliary information relating to the selected portion of the print medium; and
   wherein the audio output device is a speaker or an audio jack.

6. The system of claim 1 wherein the audio output device is a speaker or an earphone.

7. The system of claim 1 wherein the print media receiving unit assembly further comprises a visual output device.

8. The system of claim 1 wherein the print media receiving unit assembly further comprises a voice generator.

9. A method of augmenting a print medium, the method comprising:

(a) electronically encoding information relating to portions of the print medium; and (b) transmitting the information relating to the portions of the print medium to a user via the Internet using a server computer, wherein the transmitted information is to be used in a portable print media receiving unit assembly comprising (i) a platform including a surface with the print medium on the surface, (ii) an electronic position determining system capable of determining a position of a selected portion of the print medium using an electronic map that correlates print elements in the print medium with their locations in the print medium when the print medium is disposed on the surface, wherein the electronic position determining system comprises a processor, (iii) an audio output device coupled to the processor, and (iv) a writeable memory device for storing the electronic map, the writeable memory device being coupled to the processor, wherein the audio output device and the processor are included in the platform in the portable print media receiving unit assembly;

wherein the information relating to portions of the print medium includes auxiliary information relating to a print element in the print medium and wherein the method further comprises transmitting the electronic map that correlates print elements in the print medium with their locations in the print medium to the user via the Internet for use in the portable print media receiving unit assembly.

10. The method of claim 9 wherein the print media receiving unit assembly further comprises:

a numeric input region disposed to a side of the surface for permitting the user to enter data.

11. The method of claim 9 wherein the electronic position determining system includes a plurality of antennas.

12. The method of claim 9 wherein the print media receiving unit assembly further comprises an alphanumeric keyboard disposed to a side of the surface.

13. The method of claim 9 wherein the print media receiving unit assembly further comprises:

a plurality of selectable icons disposed to a side of the surface.

14. The method of claim 9 wherein the print media receiving unit assembly further comprises:

a plurality of selectable icons disposed to the side of the surface; and a numeric input region for allowing a user to input data into the print media receiving unit, and wherein the electronic position determining system includes a plurality of antennas.

15. The method of claim 9 wherein transmitting the information relating to the portions of the print medium to the user comprises transmitting the information relating to the portions of the print medium to an e-mail account of the user.

16. The method of claim 9 wherein the electronic map is a first electronic map and the print medium is a first print medium, and wherein the method further comprises:

transmitting a second electronic map that correlates print elements in a second print medium with their locations in the second print medium to the user via the Internet.

17. The method of claim 9 wherein the print medium is a magazine.

18. The method of claim 9 wherein the electronic map is transmitted to a client computer operated by the user.

19. The method of claim 9 wherein the electronic map is transmitted to a client computer operated by the user and wherein the user thereafter loads the electronic map into the writeable memory device using the client computer and then inserts the writeable memory device into a housing of the print media receiving unit assembly.

20. The method of claim 9 wherein the print medium is a children's book.

21. The method of claim 9 wherein the print medium includes a number of selectable print elements that have an appearance different than non-selectable print elements in the print medium.

22. The method of claim 9 wherein the auxiliary information comprises music or voice data.

23. The method of claim 9 wherein the print medium was obtained by the user through a subscription.

24. The method of claim 9 wherein the surface is part of a platform that has a center, the platform being hinged at the center.

25. The method of claim 9 wherein the print media receiving unit assembly has a strip of numbers so that the user is able to select a page number for the print medium.

26. The method of claim 9 wherein the electronic position determining system includes an antenna system.

27. The method of claim 9 wherein the electronic position determining system includes pressure sensitive switches that are under the surface.

28. The method of claim 9 wherein the writeable memory device comprises a flash memory device.

29. The method of claim 9 wherein the print medium is a publication and wherein (a) and (b) are performed by a publisher of the publication.

30. The method of claim 9 wherein the print medium is a publication and wherein (a) is performed by a publisher of the publication and (b) is performed by a host entity.

31. The method of claim 9 wherein the print medium is in the form of a single sheet.

32. The method of claim 9 further comprising receiving at the server computer information relating to a selected portion of the print medium and then performing a task after receiving the information relating to the selected portion of the print medium using the server computer.

33. The method of claim 9 further comprising sending the print medium to the user through the U.S. mail.

34. The method of claim 9 wherein the print media receiving unit assembly and the print medium on the surface are used without being in direct communication with the server computer.

35. The method of claim 9 wherein the writeable memory device is a removable writeable memory device.

36. The method of claim 9 wherein the surface is planar.

37. The method of claim 9 wherein the print media receiving unit assembly further comprises a stylus.

38. The method of claim 9 further comprising a voice synthesizer in the platform.

* * * * *